S. Rockafellow,
Horse Rake.
No. 111,150.  Patented Jan. 24, 1871.
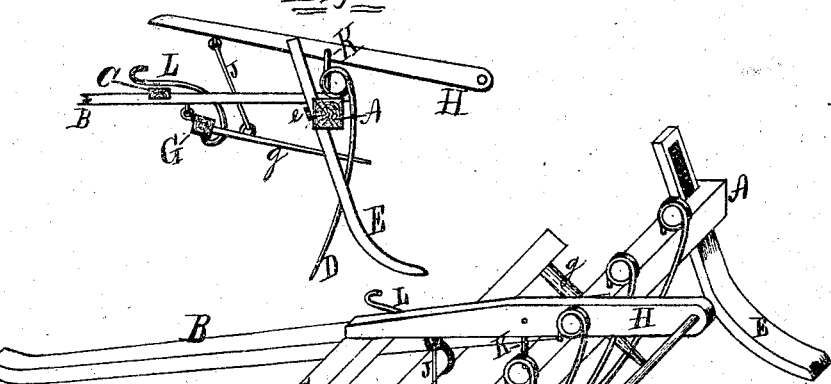
Fig. 2.
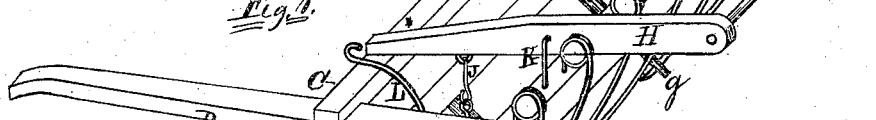
Fig. 4.
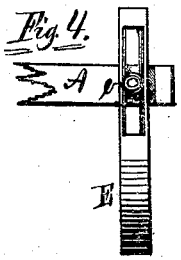
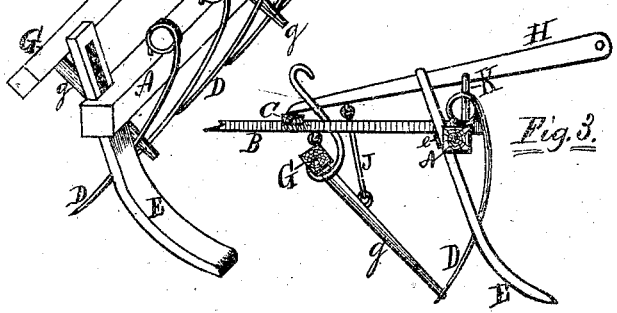
Fig. 3.
Witnesses:
Statt R Richards.
D. H. Clarke.
Inventor,
Samuel Rockafellow,
by W. B. Richards,
his atty.

UNITED STATES PATENT OFFICE.

SAMUEL ROCKAFELLOW, OF MOLINE, ILLINOIS.

IMPROVEMENT IN HORSE HAY-RAKES.

Specification forming part of Letters Patent No. 111,150, dated January 24, 1871.

I, SAMUEL ROCKAFELLOW, of Moline, in the county of Rock Island and State of Illinois, have invented certain Improvements in Horse Hay-Rakes, of which the following is a specification:

Nature and Objects of the Invention.

The nature of my invention relates to improvements in that class of rakes known as "lift-rakes;" and the invention consists, first, in so pivoting the cleaners to the main frame, and in so arranging the handles therewith, that the operation of lifting the handles to raise the rake will at the same time throw down or operate the cleaners; secondly, it consists in the arrangement of the hitching device with the cleaners and rake, so that the draft will always tend to keep the cleaners in working position.

Description of the Accompanying Drawing.

Figure 1 is a perspective view with the cleaners up in position for collecting the hay. Fig. 2 is a side elevation with the cleaners in same position as in Fig. 1. Fig. 3 is a side elevation with the cleaners down in position for discharging the hay from the rake. Fig. 4 is a detached view, showing the manner of attaching the runners.

General Description.

A is the rake-head. B B are the thills, with a cross-stay, C. Letters D represent the teeth, which are of wire, and may be attached to the head A, as shown, or in any of the improved methods. E E are curved runners, adjustably attached to the rake-head A by bolts $e\ e$, as shown at Fig. 4. G is the head of the cleaner, and $g\ g\ g\ g$ are the teeth of the same. The cleaner-head G is pivoted to the under side of the thills B B, as shown at Figs. 1, 2, and 3. H H are the handles, connected at their rear ends, as shown at Fig. 1, and their forward ends extending forward over the cross-bar C. J J are links connecting the handles H H near their forward ends with the two of the cleaner-teeth $g\ g$. K K are uprights or standards projecting from the rake-head A, and to which the handles H H are pivoted near their centers. L L are the draft-hooks, projecting from the cleaner-head G upward, and curving forward, as shown plainly at Figs. 1, 2, and 3.

The operation of my invention is deemed simple, from an inspection of the drawing.

The runners E E may be adjusted, as shown, to adapt the rake to different heights of teams, or to bring the points of the teeth D lower or higher, as desired.

Figs. 1 and 2 show the rake in position for collecting the hay forward of the teeth D, as the rake is drawn forward by the draft-animals.

To discharge the hay and leave it in windrows or otherwise, the operator simply lifts the rake by the handles H H, the forward ends of which drop by the operation onto the cross-bar C, and the handles H H, turning at the same time on the pivots K K, throw down the cleaner-teeth $g\ g\ g\ g$, and sweep the hay from the teeth D D D D, between which they pass.

As soon as the rake in its elevated position has passed over the collected bundle of hay, the operator drops it again to the ground, and the draft on the hooks L L brings them forward and the cleaner-teeth $g\ g\ g\ g$ again up to the position shown at Figs. 1 and 2.

Claims.

1. The handles H H, cleaner G $g\ g$, and links J J, when arranged to operate with the rake A D D, and thills B B, and cross-bar C, substantially as described, so that lifting the rake by the handles H H operates the cleaners G $g\ g$.

2. The draft-hooks L L, combined and arranged to operate with the cleaners G $g\ g$, thills B B, and rake A D D, substantially as described, and for the purpose specified.

SAMUEL ROCKAFELLOW.

Witnesses:
HARRY C. GOOD,
C. F. HEMENWAY.